US006850655B2

(12) United States Patent
Sorin et al.

(10) Patent No.: US 6,850,655 B2
(45) Date of Patent: Feb. 1, 2005

(54) OPTICAL APPARATUS WITH FARADAY ROTATOR, STATIC GAIN FLATTENING FILTER AND VARIABLE OPTICAL ATTENUATOR

(75) Inventors: Wayne V. Sorin, Mountain View, CA (US); Byoung Yoon Kim, Mountain View, CA (US)

(73) Assignee: Novera Optics, Inc., Palo Alto, CA (US)

( * ) Notice: Subject to any disclaimer, the term of this patent is extended or adjusted under 35 U.S.C. 154(b) by 287 days.

(21) Appl. No.: 09/805,489

(22) Filed: Mar. 13, 2001

(65) Prior Publication Data

US 2001/0038730 A1 Nov. 8, 2001

Related U.S. Application Data

(63) Continuation-in-part of application No. 09/801,566, filed on Mar. 7, 2001, now Pat. No. 6,600,027, which is a continuation-in-part of application No. 09/765,971, filed on Jan. 19, 2001, now Pat. No. 6,631,224, which is a continuation-in-part of application No. 09/729,661, filed on Dec. 4, 2000, now Pat. No. 6,510,261, which is a continuation-in-part of application No. 09/666,763, filed on Sep. 21, 2000, now Pat. No. 6,539,148, and a continuation-in-part of application No. 09/571,092, filed on May 15, 2000, now Pat. No. 6,253,002, which is a continuation of application No. 09/425,099, filed on Oct. 22, 1999, now Pat. No. 6,233,379, which is a continuation-in-part of application No. 09/022,413, filed on Feb. 12, 1998, now Pat. No. 6,021,237.

(60) Provisional application No. 60/206,767, filed on May 23, 2000.

(30) Foreign Application Priority Data

Jun. 6, 1997 (KR) .............................................. 97-24796

(51) Int. Cl.[7] ................................................. G02B 6/00
(52) U.S. Cl. ............................. 385/11; 385/28; 385/27; 385/29; 385/31; 385/24; 385/140
(58) Field of Search ............................. 385/1, 2, 3, 11, 385/7, 28, 27, 29, 31, 39, 42, 47, 24, 140

(56) References Cited

U.S. PATENT DOCUMENTS

| | | | |
|---|---|---|---|
| 4,068,191 A | 1/1978 | Zemon et al. | 385/28 |
| 4,768,851 A | 9/1988 | Shaw et al. | 385/28 X |
| 4,781,425 A | 11/1988 | Risk et al. | 385/11 X |
| 4,828,350 A | 5/1989 | Kim et al. | 385/28 |
| 4,832,437 A | 5/1989 | Kim et al. | 385/28 |
| 4,915,468 A | 4/1990 | Kim et al. | 385/28 |
| 4,971,417 A | 11/1990 | Krinsky et al. | 307/425 |
| 5,007,705 A | 4/1991 | Morey et al. | 385/28 |
| 5,022,732 A | 6/1991 | Engan et al. | 385/28 X |

(List continued on next page.)

FOREIGN PATENT DOCUMENTS

| | | |
|---|---|---|
| DE | 3430766 A1 | 8/1984 |
| EP | 0 143 583 A2 | 11/1984 |
| EP | 0 144 190 A2 | 11/1984 |
| EP | 0 221 560 A2 | 11/1986 |
| KR | 1997-24796 | 6/1997 |

OTHER PUBLICATIONS

PCT Notification of Transmittal of the International Search Report, PCT/US01/15730, International Filing Date: Jun. 15, 2001, Date of Mailing: May 29, 2002.
M.-Y. Jeon et al., "An Electronically Wavelength Tunable Mode-Locked Fiber Laser Using an All-Fiber Acousto-Optic Tunable Filter", Proceedings of the 10th International Conference, Del Coronado, CA May 28–Jun. 1, 1996, pp. 20–21.

(List continued on next page.)

Primary Examiner—Brian Healy
(74) Attorney, Agent, or Firm—Blakely, Sokoloff, Taylor & Zafman LLP

(57) ABSTRACT

An optical apparatus for transmitting an optical signal includes a static filter, a Faraday rotator and a reflector. The Faraday rotator makes a first change in polarization of an optical signal in a first direction, and a second change in polarization of the optical signal received from the reflector in a second direction. This produces a polarization of the optical signal that is substantially orthogonal to an initial polarization state of the optical signal.

85 Claims, 3 Drawing Sheets

U.S. PATENT DOCUMENTS

| | | | |
|---|---|---|---|
| 5,287,214 A * | 2/1994 | Robertson et al. | 359/260 |
| 5,481,402 A * | 1/1996 | Cheng et al. | 359/498 |
| 5,532,864 A | 7/1996 | Alexander et al. | 359/177 |
| 5,537,238 A | 7/1996 | Janniello et al. | 359/110 |
| 5,550,940 A | 8/1996 | Vengsarkar et al. | 385/28 |
| 5,588,078 A * | 12/1996 | Cheng et al. | 385/33 |
| 5,600,466 A | 2/1997 | Tsushima et al. | 398/81 |
| 5,600,473 A | 2/1997 | Huber | 385/10 X |
| 5,652,809 A | 7/1997 | Aronson | 385/7 |
| 5,708,736 A | 1/1998 | Steinblatt | 385/28 |
| 5,805,751 A | 9/1998 | Kewitsch et al. | 385/43 |
| 5,864,414 A | 1/1999 | Barnsley et al. | 385/81 |
| 5,912,748 A * | 6/1999 | Wu et al. | 359/117 |
| 5,953,470 A | 9/1999 | Toyohara | 385/24 |
| 5,970,201 A | 10/1999 | Anthony et al. | 385/140 |
| 5,991,476 A | 11/1999 | Baney et al. | 385/16 |
| 6,021,237 A | 2/2000 | Kim et al. | 385/28 |
| 6,048,103 A * | 4/2000 | Furukata et al. | 385/73 |
| 6,058,226 A | 5/2000 | Starodubov | 385/12 |
| 6,104,856 A | 8/2000 | Lampert | 385/140 |
| 6,151,157 A | 11/2000 | Ball et al. | 359/341 |
| 6,151,427 A | 11/2000 | Satorius | 385/7 |
| 6,181,840 B1 | 1/2001 | Huang et al. | 385/10 |
| 6,233,379 B1 | 5/2001 | Kim et al. | 385/28 X |
| 6,253,002 B1 | 6/2001 | Kim et al. | 385/28 X |
| 6,266,462 B1 | 7/2001 | Kim et al. | 385/28 X |
| 6,278,536 B1 | 8/2001 | Kai et al. | 385/28 |
| 6,289,699 B1 | 9/2001 | Kewitsch et al. | 65/406 |
| 6,292,290 B1 | 9/2001 | Wan et al. | 385/28 X |
| 6,343,165 B1 | 1/2002 | Kim et al. | 385/28 X |
| 6,510,261 B2 | 1/2003 | Sorin et al. | 385/28 X |
| 6,539,148 B1 | 3/2003 | Kim et al. | 385/28 X |
| 6,631,224 B2 | 10/2003 | Sorin et al. | 385/28 |
| 6,640,027 B2 * | 10/2003 | Kim et al. | 385/28 |

OTHER PUBLICATIONS

D. S. Starodubov et al., "All–Fiber Bandpass Filter with Adjustable Transmission Using Cladding–Mode Coupling", IEEE Photonics Technology Letters, vol. 10, No. 11, Nov. 1998, pp. 1590–1592.

M. G. Xu et al., "Tunable fibre bandpass filter based on a linearly chirped fibre Bragg grating for wavelength demultiplexing", Electronics Letters, vol. 32, No. 20, Sep. 26, 1996, pp. 1918–1919.

K. Sugden et al., "Fabrication and Characterization of Bandpass Filters Based on Concatenated Chirped Fiber Gratings", Journal of Lightwave Technology, vol. 15, No. 8, Aug. 1997, pp. 1424–1432.

Timothy E. Dimmick et al., "All–Fiber Acousto–Optic Tunable Bandpass Filter", Optical Society of America, 2000, pp. 3 total.

In Kag Hwang et al., "All–fiber-optic nonreciprocal modulator", Optics Letters, vol. 22, No. 8, Apr. 15, 1997, pp. 507–509.

Sorin, W.V. et al., "Phase Velocity Measuerments using Prism Output for Single and Few–Mode Fibers", Optics Letters, Feb. 1986, vol. 11, No. 2, pp. 106–108.

Blake, B.Y. et al, "Fiber–Optic Modal Coupler using Periodic Microbending", Optics Letters, Mar. 1986, vol. 11, No. 3, pp. 177–179.

Kim, B.Y. et al., "All–Fiber Acousto–Optic Frequency Shifter", Optics Letters, Jun. 1986, vol. 11, No. 6, pp. 389–391.

Sorin, W.R. et al, "Highly Selective Evanescent Modal Filter fot Two–Mode Optical Fibers", Optics Letters, Sep. 1986, vol. 11, No. 9, pp. 581–583.

Blake, J.N. et al, "Analysis of Intermodal Coupling in a Two–Mode Fiber with Periodic Microbends", Optics Letters, Apr. 1987, vol. 12, No. 4, pp. 281–283.

Kim, B.Y. et al, "Use of Highly Elliptical Core Fibers for Two–Mode Fiber Devices", Optics Letters, Sep. 1987, vol. 12, No. 9, pp. 729–731.

Blake, J. N., et al, "Strain Effects on Highly Elliptical Core Two–Mode Fibers", Optics Letters, Sep. 1987, vol. 12, No. 9, pp. 732–734.

Engan, H.E. et al, Propagation and Optical Interaction of Guided Acoustic Waves in Two–Mode Optical Fibers, IEEE Journal of Lightwave Technology, Mar. 1988, vol. 6, No. 3, pp. 428–436.

Park, H.G. et al, "Intermodal Coupler using Permanently Photo–Indiced Grating in Two–Mode Optical Fibre", Electronic Letters, Jun. 8, 1989, vol. 25, No. 12, pp. 797–799.

Park, H.G. et al, "All –Optical Intermodl Switch using Periodic Coupling in a Two–Mode Waveguide", Optics Letters, Aug. 15, 1989, vol. 14, No. 16, pp. 877–879.

Huang, S.Y. et al, "Perturbation Effects on Mode Propagation in Highly Elliptical Core Two–Mode Fibers", IEEE Journal of Lightwave Technology, Jan. 1990, vol. 8, No. 1, pp. 23–33.

Koh, Y.W. et al, "Strain Effects on Two Mode Fiber Gratings", Optics Letters, Apr. 1, 1993, vol. 18, No. 7, pp. 497–499.

Yun, S.H. et al, "All–fiber Tunable Filter and Laser based on Two–mode Fiber", Optics Letters, Jan. 1996, vol. 21; No. 1, pp. 27–29.

Yun, S.H. et al, "Suppression of Polarization Dependence in a Two–Mode Fiber Acousto–Optic Device", Optics Letters, Jun. 15, 1996, vol. 21, No. 12, pp. 908–910.

Kim, H.S. et al, "Longitudinal Mode Control in Few–Mode Erbium–Doped Fiber Lasers", Optics Letters, Aug. 1, 1996, vol. 21, No. 15, pp. 1144–1146.

Jeon, M.Y. et al, "An Electronically Wavelength–Tunable Mode–Locked Fiber Laser Using an All–Fiber Acoustooptic Tunable Filter", IEEE Photonics Technology Letters, Dec. 1996, vol. 8, No. 12, pp. 1618–1620.

Kim, H.S. et al, "All–fiber acousto–optic tunable notch filter with electronically controllable profile", Optics Letters, Oct. 1, 1997, vol. 22, No. 19, pp. 1476–1478.

Yun, S.H. et al, "Wavelenght–Swept Fiber Laser with Frequency Shifted Feedback and Resonantly Swept Intra–Cavity Acoustooptic Tunable Filter", IEEE Journal of Selected Topics in Quantum Electronics, Aug. 1997, vol. 3, No. 4, pp 1087–1096 (Invited Paper).

Jeon, M.Y. et al, "Harmonically mode–locked fiber laser with an acoutso–optic modulator in a Sagnac loop and Faraday rotating mirror cavity", Optics Communications, Apr. 15, 1998, vol. 149, pp. 312–316.

Kim, H.S. et al, "Actively gain–flattened erbium–doped fiber amplifier over 35nm using all–fiber acoustooptic tunable filters", IEEE Photonics Technology Letters, Jun. 1998, vol. 10, No. 6, pp. 790–792.

Hwang, J.K. et al, "Long–period fiber gratings based on periodic microbends", Optics Letters, Sep. 15, 1999, vol. 24, No. 18, pp. 1263–1265.

Yun, S.H. et al, "Dynamic Erbium–Doped Fiber Amplifier Based on Active Gain Flattening with Fiber Acoustooptic Tunable Filters", IEEE Photonics Technology Letters, Oct. 1999, vol. 11, No. 10, pp. 1229–1231.

Blake, J.N. et al, "All–Fiber Acousto–Optic Frequency Shifter using Two–Mode Fiber", *Proceedings of the SPIE Fiber Optic Gyros*, Sep. 1986, vol. 719, pp. 92–100.

Blake, B.Y. et al, "Acousto–Optic Frequency Shifting in Two–Mode Optical Fibers", *OFS '86, Tokyo, Japan*, Oct. 8–10, 1988, pp. 159–162.

Engan, H.E. et al, "Optical Frequency Shifting in Two–Mode Optical Fibers by Flexural Acoustic Waves", *IEEE 1986 Ultrasonics Symposium*, Nov. 17–19, 1986, pp. 435–438.

Huang, S.Y. et al, "Mode Characteristics of Highly Elliptical Core Two–Mode Fibers under Purterbations", *OFS '88, New Orleans, Louisiana*, Jan. 27–29, 1988, pp. 14–17.

Kim, B.Y. et al, "Few–Mode Fiber Devices", *OFS '88, New Orleans, Louisiana*, Jan. 27–29, 1988, pp. 146–149, (Invited Paper).

Kim, B.Y. et al, "Fiber–Optic Device Research at Stanford University", *Proceedings SPIE, Fiber Optic and Laser Sensors, Boston, Massachusetts*, Sep. 5–7, 1989, vol. 1169, pp. 10–15, (Invited Paper).

Kim, B.Y. et al, "Few–Mode Fiber Devices", *ICOESE '90, Beijing,China*, Aug. 1990, vol. 2, pp. 146–149, (Invited Paper).

Koh, Y.W. et al, "Mode Coupling Fiber Gratings for Fiber Optic Devices", *OFS–9, Firenze, Italia*, May 4–6, 1993, pp. 35–38.

Yun, S.H. et al, "All–Fiber Acousto–Optic Tunable Filter", *OFC '95, San Diego, California*, Feb. 26–Mar. 3, 1995, pp. 186–187.

Yun, S.H. et al, "Electonically Tunable Fiber Laser Using All–Fiber Acousto–Optic Tunable Filter", *IOOC '95 (10th International Conference on Integrated Optics and Optical Fibre Communication) Hong Kong*, Jun. 26–30, 1995, pp. 22–23.

Yun, S.H. et al, "Polarization Dependenceof Two–Mode Fiber–Acousto–Optic Device", *OFS–11, Sapporo, Hokkaido, Japan*, May 21–24, 1996, pp. 478–481.

Jeon, M. Y. et al, "Harmonically Mode–Locked Fiber Using an All–Fiber Acousto–Optic Tunable Filter", *OFC '97, Dallas, Texas*, Feb. 16–22, 1997, pp. 166–167.

Yun, S.H. et al, "Wavelength—swept Fiber Laser with Frequency–Shifted Feedback", *OFC '97, Dallas, Texas*, Feb. 16, 1997, pp. 30–31.

Kim, H.S. et al, "Single–Mode–Fiber Acousto–Optic Tunable Notch Filter", *2nd Optoelectronics & Communications Conference '97*, Jul. 8–11, 1997, pp. 226–227.

Yun, S.H. et al, "Fiber grating sensor array demodulation using wavelength–swept fiber laser", *OFS–12, Williamsburg, Virginia*, Oct. 28–31, 1997.

Hwang, I.K. et al, "All–fiber nonreciprocal comb filter with wavelength tunability", *OFC '98, ThQ5, San Jose, USA*, Feb. 22–27, 1998, pp. 336–338.

Kim, H.S. et al, "Dynamic gain equalization of erbium–doped filter amplifier with all–fiber–acousto–optic tunable filters", *OFC '98, WG4, San Jose, USA*, Feb. 22–27, 1998, pp. 136–138.

Koh, Y.W. et al, "Broadband Polarization–Insensitive All–Fiber Acousto–Optic Modualtor", *OFC '98, WM50, San Jose, USA*, Feb. 22–27, vol. 2, pp. 239–240.

Oh, K. et al., "Characterization of elliptic core fiber acousto–optic tunable filters operated in the single mode and the multi–mode range", *OFC '98, WM59, San Jose, USA*, vol. 2, p. 250–251.

Yun, S.H. et al, "Generation of self–starting mode–locked pulses in wavelength–swept fiber lasers", *CLEO/IQEC '98, San Francisco, USA*, May 3–8, 1998.

Hwang, I.K. et al, "Long–Period Gratings based on Arch–induced Microbends", *OECC '98, Chiba, Japan*, Jul. 12–16, 1998, pp. 144–145.

Kim, B.Y. et al, "Fiber Based Acousto–Optic Filters", *OFC/IOOC '99, San Diego, USA*, Feb. 21–26, 1999, pp. 199–201, (Invited Paper).

Hwang, I.K. et al, "Profile–controlled long–period fiber gratings based on microbends", *OFC/IOOC '99, San Diego, California*, Feb. 21–26, 1999, pp. 177–179.

Park, H.S. et al, "All–fiber add–drop multiplexer using a tilted fiber Bragg grating and mode–selective couplers", *OFC/IOOC '99, San Diego, California, USA*, Feb. 21–26, 1999, TuH6, pp. 91–93.

Kim. B.Y., "Acousto–optic Components for WDM Applications", *IEEE/LEOS Summer Topical Meetings, San Diego, USA*, Jul. 26–28, 1999, pp. 47–48, (Invited Paper).

Kim, B.Y., "Acousto–optic filters for fiber systems", *ICO–128, San Francisco, USA*, Aug. 2–6, 1999, pp. 92–93, (Invited Paper).

Song, K.Y. et al, "High Performance Fused–type Mode Selective Couple for Two–mode Fiber Devices", *OFC 2000, Baltimore, USA*, Mar. 5–10, 2000, vol. 37, TuB5.

Risk, W.P. et al, "Acousto–optic frequency shifting in birefringent fiber", *Optics Letters*, 1984, vol. 9, No. 7, pp. 309–311.

Birks, T.A. et al, "Four–port fiber frequency shifter with a null tapre coupler", *Optics Letters*, 1994, vol. 19, No. 23, pp. 1964–1966.

Berwick, M. et al, "Coaxial optical–fiber frequency shifter", *Optics Letters*, Feb. 15, 1992, vol. 17, No. 4, pp. 270–272.

Lisboa, O. et al, "New configuration for an optical fiber acousto–optic frequency shifter", *Proc. Soc. Photo–Opt. Instrum. Eng.*, Mar. 13–14, 1990, vol. 1267, pp. 17–23.

Culverhouse, D.O. et al, "Four port fused taper acousto–optic deviceusing standard single mode telecommunication fiber", *Electronic Letters*, Jul. 20, 1995, vol. 31, No. 15, pp. 1279–1280.

Culverhouse, D.O. et al, "Low–loss all–fiber acousto–optic tunable filter", *Optic Letters*, 1997, vol. 22, No. 2, pp. 96–98.

Dimmick, T.E. et al, "Compact all–fiber acoustooptic tunable filters with small bandwidth–length product", *IEEE Photonics Technology Letters*, Sep. 2000, vol. 12, No. 9, pp. 1210–1212.

Kakarantzas, G. et al, "High strain–induced wavelength tunablility in tapered fibre acousto–optic filters", *Electronics Letters*, Jul. 6, 2000, vol. 36, No. 14, pp. 1187–1888.

Dimmick, T.E. et al, "Narrow–band acousto–optic tunable filter fabricated from highly uniform tapered optical fiber", *Optical Fiber Communication Conference, 2000*, 2000, vol. 4, pp. 25–27.

Russell, P.S.J. et al, "All–Fibre Frequency Shifters, Modulators and Switches", *Lasers and Electro–Optics Europe, 1998*, 1998, p. 349.

Birks, T.A. et al, "Control of bandwidth in fiber acousto–optic tunable filters and other single–mode null coupler devices", *Lasers and Electro–Optics, 1997*, 1997, vol. 11, pp. 444–445.

Culverhouse, D.O. et al, "40–MHz all–fiber acoustooptic frequency shifter", *IEEE Photonics Technology Letters*, Dec. 1996, vol. 8, No. 12, pp. 1636–1637.

Birks, T.A. et al, "The acousto–optic effect in single–mode fiber tapers and couplers", *Journal of Lightwave Technology*, Nov. 1996, vol. 14, No. 11, pp. 2519–2529.

Culverhouse, D.O. et al, "All–fibre Acousto–optic Tunable Filter Based On a Null Coupler", *Optical Communication 1996. ECOC '96*, 1996, vol. 3, pp. 317–320.

Birks, T.A. et al, "Low power acousto–optic device based on a tapered single–mode fiber", *IEEE Photonics Technology Letters*, Jun. 1994, vol. 6, No. 6, pp. 725–727.

Zayer, N.K. et al, "In situ ellipsometric monitoring of growth of zinc oxide thin films with applications to high–frequency fiber acousto–optic components", *Lasers and Electro–Optics, 1998. CLEO '98*, 1998, pp. 251–252.

Pannell, C.N. et al, "In–fiber and fiber–compatible acoustooptic components", *Jouranl of Lightwave Technology*, Jul. 1995, vol. 13, No. 7, pp. 1429–1434.

Abdulhalim, I. et al, "Acoustooptic in–fiber modulator acoustic focusing", *IEEE Photonics Technology Letters*, Sep. 1993, vol. 5, No. 9, pp. 999–1002.

Huang, D.W. et al, "Q–switched all–fiber laser with an acoustically modulated fiber attenuator", *IEEE Photonics Technology Letters*, Sep. 2000, vol. 12, No. 9, pp. 1153–1155.

Huang, D.W. et al, "Reflectivity–tunable fiber Bragg grating reflectors", *IEEE Photonics Technology Letters*, Feb. 2000, vol. 12, No. 2, pp. 176–178.

Liu, W.F. et al, "Switchable narrow bandwidth comb filter based on an acoustooptic superlattice modulator in Sinc–sampled fiber gratings", *Lasers and Electro–Optics, 1999*, 1999, pp. 77–78.

Liu, W.F. et al, "100% efficient narrow–band acoustooptic tunable reflector using fiber Bragg grating", *Journal of Lightwave Technology*, Nov., 1998, vol. 16, No. 11, pp. 2006–2009.

Patterson, D.B. et al, "Frequency shifting in optical fiber using a Saw Horn", *Ultrasonics Symposium, 1990*, 1990, vol. 2, pp. 617–620.

Patterson, D.B. et al, "Noninvasive switchable acousto–optic taps for optical fiber", *Journal of Lightwave Technology*, Sep. 1990, vol. 8, No. 9, pp. 1304–1312.

Kim, H.S. et al, "Single–mode fiber acousto–optic tunable notch filter with variable spectral profile", Optical Fiber Communication Conference, Optical Society of America Technical Digest Series, vol. 6, pp. PD7–1–4, 1997.

Frangen, et al, "Integrated Optical Acoustically Tunable Wavelength Filter", Electronic Letters, vol. 25, Iss. No. 23, pp. 1583–1584, 1989.

Vengsarkar, et al, "Long–Period Fiber–Grating–Based Gain Equalizers", Optic Letters, vol. 21, No. 5, pp. 336–338, 1996.

Tian, F. et al, "Interchannel Interference in Multiwavelength Operation of Integrated Acousto–Optical Filters and Switches", Journal of Lightwave Technology, vol. 13, No. 6, pp. 1146–1154, 1995.

F. Shehadeh, R.S. Vodhanel, M. Krain, C. Gibbons, R.E. Wagner, and M. Ali, Gain–Equalized, Eight–Wavelength WDM Optical Add–Drop Multiplexer with an 8–dB Dynamic Range, IEEE Photonic Technology Letters, vol. 7, No. 9, pp. 1075–1077 (Sep. 7, 1995).

J.N. Blake, B.Y. Kim, H.E. Engan, and H.J. Shaw, "Analysis of intermodal coupling in a two–mode fiber with periodic microbends", Opt. Lett., vol. 12, 281–283 (1987).

B.Y. Kim, J.N. Blake, H.E. Engan, and H.J. Shaw, "Acousto–optic frequency–shifting in two–mode optical fibers", OFS '86, Tokyo, Japan (Oct. 8–10, 1986).

H.E. Engan, B.Y. Kim, J.N. Blake, and H.J. Shaw, "Propagation and optical interaction of guided acoustic waves in two–mode optical fibers", Journal of Lightwave Technology, vol. 6, 428–436 (1988).

J.O. Askautrud and H.E. Engan, "Fiberoptic frequency shifter with no mode change using cascaded acousto–optic interaction regions", Opt. Lett., vol. 15, 649–651 (1990).

H.E. Engan, T. Myrtveit, and J.O. Askautrud, "All–fiber acousto–optic frequency shifter excited by focused surface acoustic waves", Opt. Lett., vol. 16, 24–26 (1991).

H.E. Engan, D.Östling, P.O. Kval, and J.O. Askautrud, "Wideband operation of horns for excitation of acoustic modes in optical fibers", Proc. OFS(10), Glasgow, Oct. 11th—13th, 1994, 568–571 (SPIE Proc. 2360).

D. Östling and H.E. Engan, "Narrow–band acousto–optic tunable filtering in a two–mode fiber", Opt. Lett., vol. 20, 1247–1249 (1995).

H.E. Engan, "Analysis of polarization mode coupling by acoustic torsional waves in optical fibers", J. Opt. Soc. Am. A., vol. 13, 112–118 (1996).

D. Östling and H.E. Engan: "Spectral flattening by an all–fiber acousto–optic tunable filter", 1995 IEEE Ultrasonics Symposium, 837–840.

D. Östling and H.E. Engan: "Broadband spatial mode conversion by chirped fiber bending", Opt. Lett., vol. 21, 192–194 (1996).

D. Östling and H.E. Engan: "Polarization–selective mode coupling in two–mode Hi–Bi fibers", Journal of Lightwave Technology, vol. 15, 312–320 (1997).

D. Östling, B. Langli, and H.E. Engan: "Intermodal beat lengths in birefringent two–mode fibers", Opt. Lett., vol. 21, 1553–1555 (1996).

H.E.Engan, "Acoustic torsional waves used for coupling between optical polarization modes in optical fibers", 1996 IEEE Ultrasonics Symposium, 799–802.

D. Östling and H.E. Engan: "Acousto–optic tunable filters in two–mode fibers", Optical Fiber Technology, vol. 3, 177–183 (1997).

B. Langli, P. G. Sinha and K. Bløtekjær, *"Acousto–Optic Mode Coupling of Partially Coherent Light in Two–Mode Fibers"*, Optical Review, vol. 4 No. 1A, pp. 121–129, Jan./Feb. 1997.

T.A. Birks, P.S.J. Russell and C.N. Pannell, "Low power acousto–optic device based on a tapered single–mode fiber", IEEE Photonics Technol. Lett., vol. 6, p. 725–727 (1994).

M. Berwick and D.A. Jackson, "Coaxial optical–fiber frequency shifter", Opt. Lett., vol. 17, 270–272 (1992).

J. Blake and P. Siemsen, "Practical compact high performance fiber–optic frequency shifter", Proc. $9^{th}$ OFS Conference, Firenze, pp. 301–304 (1993).

W. P. Risk, G. S. Kino and H. J. Shaw, "Fiber–optic frequency shifter using a surface acoustic wave incident at an oblique angle", Optics Letters, vol. 11, No. 2, pp 115–117, 1986.

W. P. Risk, R. C. Youngquist, G. S. Kino and H. J. Shaw, "Acousto–optic frequency shifting in birefringent fiber", Optics Letters, vol. 9, No. 7, pp 309–311, 1984.

W. P. Risk and–G. S. Kino, "Acousto–optic fiber–optic frequency shifter using periodic contact with a copropagating surface acoustic wave", Optics Letters, vol. 11, No. 5, pp 336–338, 1986.

W. P. Risk and G. S. Kino, "Acousto–optic polarization coupler and intensity modulator for birefringenet fiber", Optics Letters, vol. 11, No. 1, pp 48–50, 1986.

W.P. Risk, G.S. Kino and B.T. Khuri–Yakub, "Tunable optical filter in fiber–optic form", Opt. Lett., vol. 11, pp. 578–580 (1986).

S.F. Su, R. Olshansky, D.A. Smith and J.E. Baran, "Flattening of erbium–doped fibre amplifier gain spectrum using an acousto–optic tunable filter", Electron. Lett., vol. 29, p. 477–478 (1993).

Yijiang Chen, "Acousto–optic frequency shifter using coaxial fibers", Optical and Quant. Elect., vol. 21, pp. 491–498 (1989).

J. Ji, D. Uttam and B. Culshaw, "Acousto–optic frequency shifting in ordinary single–mode fibre", Electronics Letters, vol. 22, No. 21, pp 1141–1142, 1986.

C. N. Pannell, R. P. Tatam, J. D. C. Jones and D. A. Jackson, "Optical frequency shifter using linearly birefringent monomode fibre", Electronics Letters, vol. 23, No. 16, pp 847–848, 1987.

K. Nosu, H. F. Taylor, S. C. Rashieigh and J. F. Weller, "Acousto–optic phase modulator and frequency shifter for single–mode fibers", Ultrasonics Symposium, pp 476–481, 1983.

* cited by examiner

OPTICAL APPARATUS WITH FARADAY ROTATOR, STATIC GAIN FLATTENING FILTER AND VARIABLE OPTICAL ATTENUATOR

CROSS-REFERENCE TO RELATED APPLICATIONS

This application is a continuation-in part of Ser. No. 09/801,566, filed Mar. 7, 2001, and issued as U.S. Pat. No. 6,640,027 B2, which is a continuation-in-part of Ser. No. 09/765,971 filed Jan. 19, 2001, and issued as U.S. Pat. No. 6,631,224 B2, which is a continuation-in-part of Ser. No. 09/729,661 filed Dec. 4, 2000, and issued as U.S. Pat. No. 6,510,261, which is a continuation-in-part of Ser. No. 09/666,763 filed on Sep. 21, 2000, and issued as U.S. Pat. No. 6,539,148, which is a continuation-in-part of and claims the benefit of priority from Provisional Patent Application Serial No. 60/206,767, filed on May 23, 2000, Ser. No. 09/666,763 and issued as U.S. Pat. No. 6,539,148, also being a continuation in part of Ser. No. 09/571,092 filed May 15, 2000, and issued as U.S. Pat. No. 6,253,002, which is a continuation-in-part of Ser. No. 09/425,099 filed Oct. 22, 1999 and issued as U.S. Pat. No. 6,233,379, which is a continuation-in-part of Ser. No. 09/022,413 filed Feb. 12, 1998, and issued as U.S. Pat. No. 6,021,237, which claims priority to KR 97-24796 filed Jun. 6, 1997, all of which applications as are fully incorporated herein by reference.

BACKGROUND OF THE INVENTION

1. Field of the Invention

This invention relates generally to devices for transmitting optical signals, and more particularly to static filters and Faraday rotators.

2. Description of Related Art

In modern telecommunication systems, many operations with digital signals are performed on an optical layer. For example, digital signals are optically amplified, multiplexed and demultiplexed. In long fiber transmission lines, the amplification function is performed by Erbium Doped Fiber Amplifiers (EDFA's). The amplifier is able to compensate for power loss related to signal absorption, but it is unable to correct the signal distortion caused by linear dispersion, 4-wave mixing, polarization distortion and other propagation effects, and to get rid of noise accumulation along the transmission line. For these reasons, after the cascade of multiple amplifiers the optical signal has to be regenerated every few hundred kilometers. In practice, the regeneration is performed with electronic repeaters using optical-to-electronic conversion. However to decrease system cost and improve its reliability it is desirable to develop a system and a method of regeneration, or signal refreshing, without optical to electronic conversion. An optical repeater that amplifies and reshapes an input pulse without converting the pulse into the electrical domain is disclosed, for example, in the U.S. Pat. No. 4,971,417, Radiation-Hardened Optical Repeater". The repeater comprises an optical gain device and an optical thresholding material producing the output signal when the intensity of the signal exceeds a threshold. The optical thresholding material such as polydiacetylene thereby performs a pulse shaping function. The nonlinear parameters of polydiacetylene are still under investigation, and its ability to function in an optically thresholding device has to be confirmed.

Another function vital to the telecommunication systems currently performed electronically is signal switching. The switching function is next to be performed on the optical level, especially in the Wavelength Division Multiplexing (WDM) systems. There are two types of optical switches currently under consideration. First, there are wavelength insensitive fiber-to-fiber switches. These switches (mechanical, thermo and electro-optical etc.) are dedicated to redirect the traffic from one optical fiber to another, and will be primarily used for network restoration and reconfiguration. For these purposes, the switching time of about 1 msec (typical for most of these switches) is adequate; however the existing switches do not satisfy the requirements for low cost, reliability and low insertion loss. Second, there are wavelength sensitive switches for WDM systems. In dense WDM systems having a small channel separation, the optical switching is seen as a wavelength sensitive procedure. A small fraction of the traffic carried by specific wavelength should be dropped and added at the intermediate communication node, with the rest of the traffic redirected to different fibers without optical to electronic conversion. This functionality promises significant cost saving in the future networks. Existing wavelength sensitive optical switches are usually bulky, power-consuming and introduce significant loss related to fiber-to-chip mode conversion. Mechanical switches interrupt the traffic stream during the switching time. Acousto-optic tunable filters, made in bulk optic or integrated optic forms, (AOTFs) where the WDM channels are split off by coherent interaction of the acoustic and optical fields though fast, less than about 1 microsecond, are polarization and temperature dependent. Furthermore, the best AOTF consumes several watts of RF power, has spectral resolution about 3 nm between the adjacent channels (which is not adequate for current WDM requirements), and introduces over 5 dB loss because of fiber-to-chip mode conversions.

Another wavelength-sensitive optical switch may be implemented with a tunable Fabry Perot filter (TFPF). When the filter is aligned to a specific wavelength, it is transparent to the incoming optical power. Though the filter mirrors are almost 100% reflective no power is reflected back from the filter. With the wavelength changed or the filter detuned (for example, by tilting the back mirror), the filter becomes almost totally reflective. With the optical circulator in front of the filter, the reflected power may be redirected from the incident port. The most advanced TFPF with mirrors built into the fiber and PZT alignment actuators have only 0.8 dB loss. The disadvantage of these filters is a need for active feedback and a reference element for frequency stability.

A VOA is in opto-mechanical device capable of producing a desired reduction in the strength of a signal transmitted through a optical fiber. Ideally, the VOA should produce a continuously variable signal attenuation while introducing a normal or suitable insertion loss and exhibiting a desired optical return loss. If the VOA causes excessive reflectance back toward the transmitter, its purpose will be defeated.

Although fixed band-rejection filters are readily available using Bragg or long-period gratings impressed into the core of an optical fiber there are no simple, adjustable all-fiber band-rejection filters. Such filters would vary the amplitude of signals within a fixed wavelength range. Although a variable transmission band-rejection filter of sorts can be made by varying the center wavelength of a Bragg or long-period grating, as one channel is attenuated another channel is unavoidably strengthened.

Accordingly, there is a need for an improved optical apparatus that includes a Faraday rotating mirror and a fixed, static gain flattening filter in order to reduce the required tuning range of band-rejection filters. There is a further need for an optical apparatus with a variable broadband attenuator that is used to reduce the tuning range of band-rejection filters.

SUMMARY OF THE INVENTION

Accordingly, an object of the present invention is to provide an optical apparatus that provides for a reduction in the required tuning range of band-rejection filters.

Another object of the present invention is to provide an optical apparatus that includes a variable broadband attenuator to reduce the tuning range of band-rejection filters.

A further object of the present invention is to provide an optical apparatus that includes a static filter, a Faraday rotator and a reflector to create a reflected signal used to improve the performance of tunable band-rejection filters.

A further object of the present invention is to provide an optical apparatus that includes a static filter, a Faraday rotator, a variable optical attenuator and a reflector to create a reflected signal used to improve the performance of tunable band-rejection filters.

These and other objects of the present invention are achieved in an optical apparatus for transmitting an optical signal that includes a static filter, a Faraday rotator and a reflector. The Faraday rotator makes a first change in polarization of an optical signal in a first direction, and a second change in polarization of the optical signal received from the reflector in a second direction. This produces a polarization of the optical signal that is substantially orthogonal to an initial polarization state of the optical signal.

In another embodiment of the present invention, an optical apparatus for transmitting an optical signal includes a static filter, a Faraday rotator, a variable optical attenuator that attenuates at least a portion of the optical signal and a reflector. The Faraday rotator makes a first change in polarization of the optical signal received in a first direction, and a second change in polarization of the optical signal received from the reflector in a second direction. This produces a polarization of the optical signal that is substantially orthogonal to an initial polarization state of the optical signal.

In another embodiment of the present invention, an optical apparatus for transmitting an optical signal includes a static filter, a Faraday rotator and a reflector positioned along a first optical path defined by the static filter, the Faraday rotator and the reflector. The reflector reflects at least a portion of the optical signal back in a direction towards the Faraday rotator along an optical path that is not the first optical path. The Faraday rotator makes a first change in polarization of the optical signal received from the static filter, and a second change in polarization of the optical signal received from the reflector. This produces a polarization of the optical signal that is substantially orthogonal to an initial polarization state of the optical signal.

DETAILED DESCRIPTION

Figure 1:
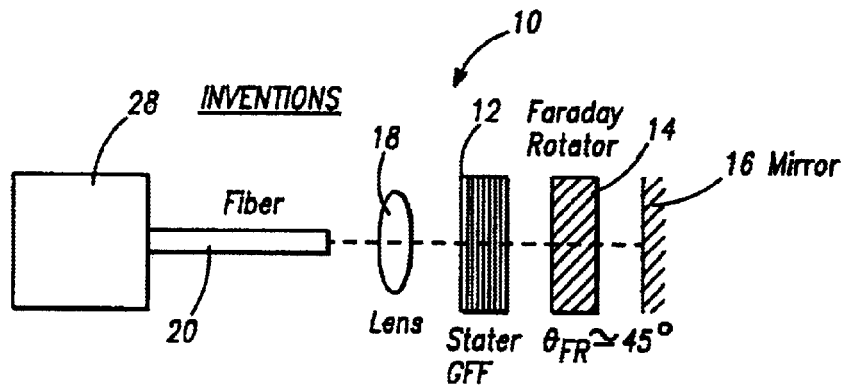
FIG. 1 is a schematic view of an embodiment of an optical apparatus of the present invention that includes a static filter, Faraday rotator and a reflector.

Referring now to FIG. 1, one embodiment of the present invention is an optical apparatus 10 for transmitting an optical signal that includes a static filter 12 and a Faraday rotator 14. A reflector 16 is included and can be positioned adjacent to Faraday rotator 14. Faraday rotator 14 makes a change in polarization of an optical signal received in a forward direction and another change in the polarization of the optical signal after it is received from reflector 16 in a reverse direction to the forward direction. This produces a reflected polarization of the optical signal that is substantially orthogonal to an input polarization state of the optical signal. The orthogonally reflected polarization state is used to average out any polarization dependent loss that the input signal experiences before reach Faraday rotator 14. Due to manufacturing errors in Faraday rotator 14 and wavelength and temperature dependence of Faraday rotation angle, substantially orthogonal means plus or minus 20%, more preferably 10%, and still more preferably 5% from the true orthogonal state.

Static filter 12 can be, an interference filter, a fiber based filter a waveguide filter and include dielectric films and a transparent substrate. Faraday rotators are used in isolators and circulators and are well known in the art. In one embodiment, Faraday rotator 14 includes a garnet faced crystal placed in a magnetic field. Faraday rotator 14 preferably has a nominally 45° rotation for linear polarization in a single pass. For a double pass, the linear polarization is nominally 90° rotation.

Optical apparatus 10 can be combined with one or more optical devices, including but not limited to dynamic gain flattening filters, band-rejection filters, sensors and the like, to reduce the polarization dependent loss of the optical device by sending an input signal forward in the optical device, and then returning in a backward direction.

An optional lens 18 is provided to re-image the optical signal back into an optical fiber 20. Suitable lenses 18 include but are not limited to graded index lenses, microlenses and the like. Lens 18 can be positioned between, optical fiber 20 and static filter 12, static filter 12 and Faraday rotator 14, or Faraday rotator 14 and reflector 16.

Reflector 16 is a high reflector that reflects at least 50% of incident light. High reflectivity mirrors are typically fabricated using metal or multi-layer dielectric coatings.

Optical fiber 20 can be a birefringent or non-birefringent single mode optical fiber or a multi-mode fiber. Optical fiber 20 can have various modes traveling within the fiber such as core modes, cladding modes, and polarization preserving modes. Optical fiber 20 can provide fundamental and cladding mode propagation along a selected length of optical fiber 20. Optical fiber 20 can be a pig-tail that optically connects to other optical fibers. These other optical fibers can be used to perform optical processing functions such as those found in band-rejection filters and the like.

Figure 2:
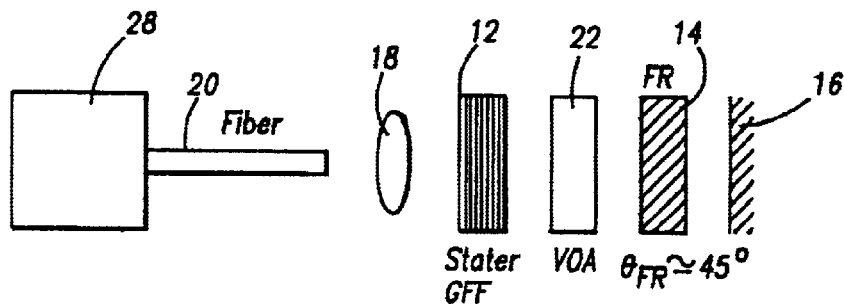
FIG. 2 is a schematic view of an embodiment of an optical apparatus of the present invention that includes a static filter, Faraday rotator, variable optical attenuator and a reflector.

FIG. 2 illustrates another embodiment of the present invention that includes a variable optical attenuator (VOA) 22 which attenuates at least a portion of the optical signal. In one embodiment VOA 22 attenuates from 0 to 40 dB, and more preferably 0 to 10 dB. For example, a VOA placed at the mid-stage of an EDFA typically requires a 0 to 10 dB attenuation range. VOA 22 can VOA 22 can be positioned between, static filter 12 and Faraday rotator 14, Faraday rotator 14 and reflector 16 and lens 18 and static filter 12.

Figure 3:
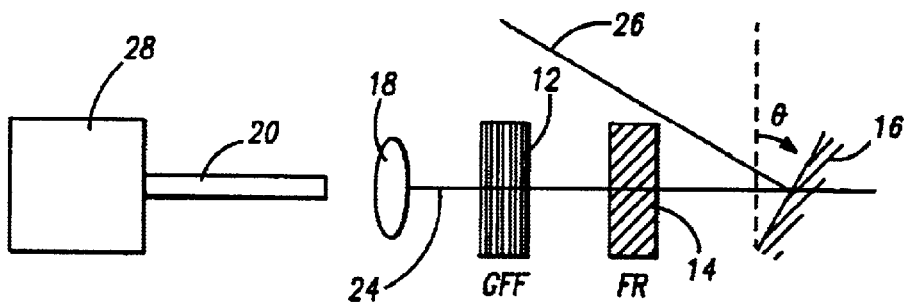
FIG. 3 is a schematic view of an embodiment of an optical apparatus of the present invention similar to FIG. 1 but with the reflector positioned at an angle θ relative to a first optical path of the apparatus.

Referring now to FIG. 3, static filter 12 and Faraday rotator 14 define a first optical path 24. Reflector 16 is positioned along an input optical path 24 at an angle θ. At angle θ, at least a portion of the optical signal received along the optical path 24 is directed along a second optical path 26. By tuning the angle θ the reflected power directed along the input optical path 24 can be varied to realize a VOA.

Numerous optical devices can be coupled to optical fiber 20 including but not limited optical processing components that affect the condition of the optical signal. In one embodiment, the optical device is a mode coupler 28. Mode coupler 28 is configured to introduce a mechanical or index deformation of a portion of the optical fiber 20, and create perturbations in the optical modes in fiber 20 and provide a coherent coupling between two modes. Mode coupler 28 can couple a core mode to a cladding mode, one core mode to a different core mode and one cladding mode to a different cladding mode Suitable mode coupler's 28 include AOTF's, acoustic gratings, UV gratings, bending gratings and stress induced gratings as disclosed in Ser. No. 09/801,566 filed Mar. 7, 2001, issued as U.S. Pat. No. 6,640,027 B2, and Ser. No. 09/765,971 filed Jan. 19, 2001, fully incorporated herein.

Figure 4:
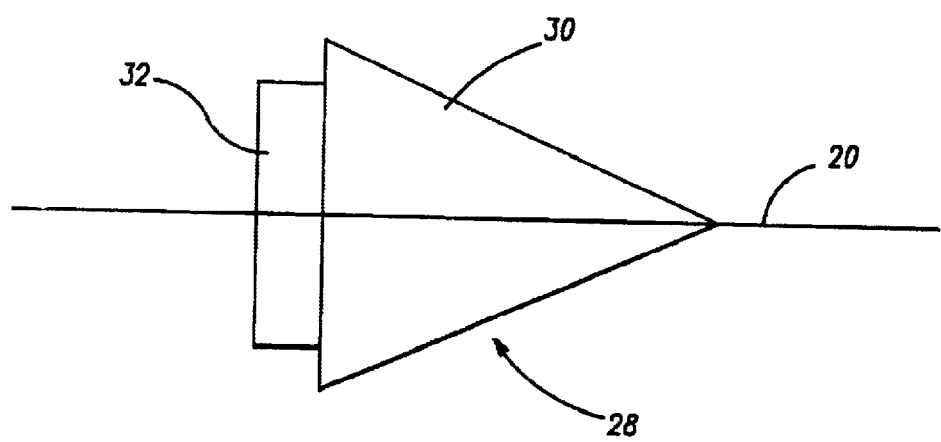
FIG. 4 is a schematic diagram of one embodiment of a acousto-optic tunable filter type of mode coupler suitable for use with the FIGS. 1, 2 and 3 embodiments.

In one embodiment, illustrated in FIG. 4, mode coupler 28 is an AOTF that includes an acoustic wave propagation member 30 and an acoustic wave generator 32. Acoustic wave generator 32 can produce multiple acoustic signals with individual controllable strengths and frequencies. Each of the acoustic signals provides a coupling between different modes traveling within optical fiber 20. A wavelength of an optical signal coupled between two different modes traveling within optical fiber 20 can be changed by varying the frequency of a signal applied to acoustic wave generator 32. Additionally, an amount of an optical signal coupled between two different modes traveling within optical fiber 20 can be changed by varying the amplitude of a signal applied to acoustic wave generator 32.

Figure 5:
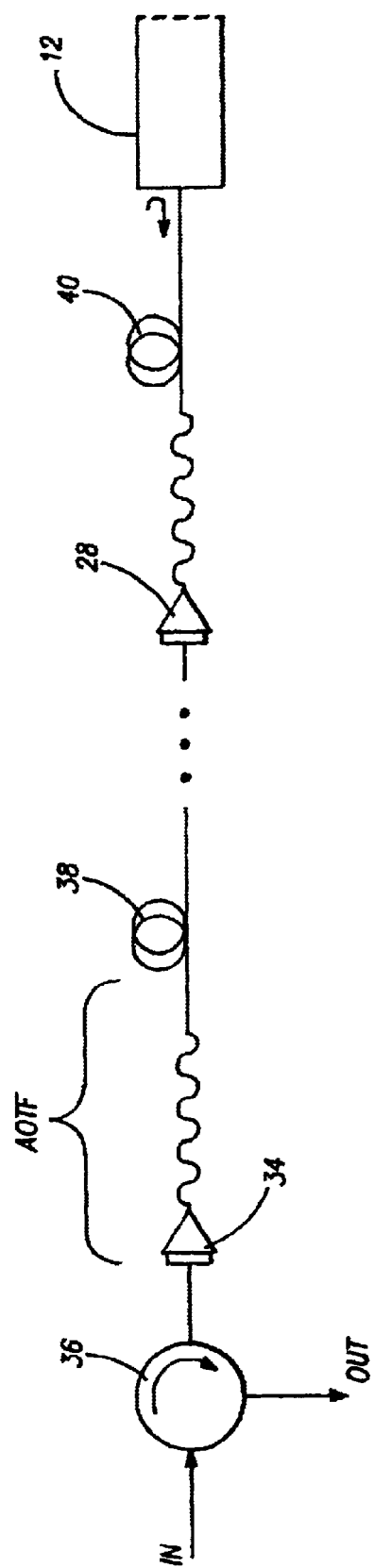
FIG. 5 is a schematic diagram of one embodiment of an multiple mode coupler apparatus that can be coupled to the optical apparatus of FIGS. 1, 2 and 3.

Referring now to FIG. 5, a second AOTF mode coupler 34 is coupled to mode coupler 28. A circulator is coupled to second AOTF mode coupler 34. Delays 38 and 40 can also be included.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An optical apparatus for transmitting an optical signal, comprising:
   a static filter that has wavelength dependent transmission;
   a Faraday rotator, wherein the Faraday rotator has a nominally 45° rotation for linear polarization;
   a reflector; and
   wherein the Faraday rotator makes a first change in polarization of the optical signal in a first direction and a second change in polarization of the optical signal received from the reflector in a second direction to produce a polarization of the optical signal that is substantially orthogonal to an initial polarization state of the optical signal.

2. The apparatus of claim 1 further comprising:
   a lens positioned to image the optical signal to an optical fiber.

3. The apparatus of claim 2, wherein the lens is positioned between the optical fiber and the static filter.

4. An optical apparatus for transmitting an optical signal, comprising:
   a static filter that has wavelength dependent transmission;
   a reflector;
   a Faraday rotator a reflector, wherein the Faraday rotator makes a first change in polarization of the optical signal in a first direction and a second change in polarization of the optical signal received from the reflector in a second direction to produce a polarization of the optical signal that is substantially orthogonal to an initial polarization state of the optical signal; and
   a lens positioned to image the optical signal to an optical fiber, wherein the lens is positioned between the static filter and the Faraday rotator.

5. An optical apparatus for transmitting an optical signal, comprising:
   a static filter that has wavelength dependent transmission;
   a reflector;
   a Faraday rotator a reflector, wherein the Faraday rotator makes a first change in polarization of the optical signal in a first direction and a second change in polarization of the optical signal received from the reflector in a second direction to produce a polarization of the optical signal that is substantially orthogonal to an initial polarization state of the optical signal; and
   a lens positioned to image the optical signal to an optical fiber, wherein the lens is positioned between the Faraday rotator and the reflector.

6. The apparatus of claim 1, wherein the reflector is a high reflector.

7. The apparatus of claim 1, wherein the reflector reflects at least 50% of incident light.

8. The apparatus of claim 1, wherein the static filter includes dielectric films and a transparent substrate.

9. The apparatus of claim 1, wherein the static filter is an interference filter.

10. An optical apparatus for transmitting an optical signal, comprising:
    a static filter that has wavelength dependent transmission, wherein the static filter is a fiber based filter;
    a Faraday rotator;
    a reflector; and
    wherein the Faraday rotator makes a first change in polarization of the optical signal in a first direction and a second change in polarization of the optical signal received from the reflector in a second direction to produce a polarization of the optical signal that is substantially orthogonal to an initial polarization state of the optical signal.

11. An optical apparatus for transmitting an optical signal, comprising:
    a static filter that has wavelength dependent transmission, wherein the static filter is a waveguide filter;
    a Faraday rotator;
    a reflector; and
    wherein the Faraday rotator makes a first change in polarization of the optical signal in a first direction and a second change in polarization of the optical signal received from the reflector in a second direction to produce a polarization of the optical signal that is substantially orthogonal to an initial polarization state of the optical signal.

12. An optical apparatus for transmitting an optical signal, comprising:

a static filter that has wavelength dependent transmission;

a Faraday rotator;

a reflector;

a mode coupler coupled to an optical fiber and configured to create perturbations in the optical modes in the optical fiber and provide coherent coupling between two modes in the optical fiber; and wherein the Faraday rotator makes a first change in polarization of the optical signal in a first direction and a second change in polarization of the optical signal received from the reflector in a second direction to produce a polarization of the optical signal that is substantially orthogonal to an initial polarization state of the optical signal.

13. The apparatus of claim 12, wherein the optical fiber has a cladding surrounding a core.

14. The apparatus of claim 12, wherein the mode coupler is selected from an acoustic grating, a UV grating, a bending grating and a stress induced grating.

15. The apparatus of claim 12, wherein the mode coupler includes an acoustic wave generator and an acoustic wave propagation member coupled to the optical fiber.

16. The apparatus of claim 12, wherein the mode coupler couples a first core mode to a second core mode.

17. The apparatus of claim 12 wherein the mode coupler couples a core mode to a cladding mode.

18. The apparatus of claim 12 wherein the mode coupler couples a cladding mode to a core mode.

19. The apparatus of claim 12 wherein the mode coupler couples a cladding mode to a different cladding mode.

20. The apparatus of claim 12 wherein the mode coupler includes an acoustic wave generator that produces multiple acoustic signals with individual controllable strengths and frequencies, each of the acoustic signals providing a coupling between different modes traveling within the optical fiber.

21. The apparatus of claim 12, wherein the mode coupler includes a temperature controlled grating that is temperature tunable.

22. The apparatus of claim 12, wherein the mode coupler includes a stress induced grating that is stress tunable.

23. The apparatus of claim 12, wherein the mode coupler includes an acoustic wave generator that produces longitudinal waves.

24. The apparatus of claim 12, wherein the mode coupler includes an acoustic wave generator that produces torsional waves.

25. The apparatus of claim 12, wherein the mode coupler includes an acoustic wave generator that produces transverse waves.

26. The apparatus of claim 12, wherein the mode coupler includes an acoustic wave generator and a wavelength of an optical signal coupled between two different modes traveling within the optical fiber is changed by varying the frequency of a signal applied to the acoustic wave generator.

27. The apparatus of claim 12, wherein the mode coupler includes an acoustic wave generator and an amount of an optical signal coupled between two different modes traveling within the optical fiber is changed by varying the amplitude of a signal applied to the acoustic wave generator.

28. An optical apparatus for transmitting an optical signal, comprising:

a static filter that has wavelength dependent transmission;

a Faraday rotator;

a variable optical attenuator that attenuates at least a portion of the optical signal;

a reflector; and wherein the Faraday rotator makes a first change in polarization of the optical signal in a first direction, and a second change in polarization of the optical signal received from the reflector in a second direction to produce a polarization of the optical signal that is substantially orthogonal to an initial polarization state of the optical signal.

29. The apparatus of claim 28, wherein the Faraday rotator has a nominally 45° rotation for linear polarization.

30. The apparatus of claim 28, further comprising:

a lens positioned to image the optical signal to an optical fiber.

31. The apparatus of claim 28, wherein the variable optical attenuator is positioned between the static filter and the Faraday rotator.

32. The apparatus of claim 28, wherein the variable optical attenuator is positioned between the Faraday rotator and the reflector.

33. The apparatus of claim 30, wherein the variable optical attenuator is positioned between the lens and the static filter.

34. The apparatus of claim 30, wherein the lens is positioned between the optical fiber and the static filter.

35. The apparatus of claim 30, wherein the lens is positioned between the static filter and the Faraday rotator.

36. The apparatus of claim 30, wherein the lens is positioned between the Faraday rotator and the reflector.

37. The apparatus of claim 28, wherein the reflector is a high reflector.

38. The apparatus of claim 28, wherein the reflector reflects at least 50% of incident light.

39. The apparatus of claim 28, wherein the filter includes dielectric films and a transparent substrate.

40. The apparatus of claim 28, wherein the filter is an interference filter.

41. The apparatus of claim 28, wherein the filter is a fiber based filter.

42. The apparatus of claim 28, wherein the filter is a waveguide filter.

43. The apparatus of claim 28, further comprising:

a mode coupler coupled to an optical fiber and configured to create perturbations in the optical modes in the optical fiber and provide coherent coupling between a first mode to a second mode in the optical fiber.

44. The apparatus of claim 43, wherein the optical fiber has a cladding surrounding a core.

45. The apparatus of claim 43, wherein the mode coupler is selected from an acoustic grating, a UV grating, a bending grating and a stress induced grating.

46. The apparatus of claim 43, wherein the mode coupler includes an acoustic wave generator and an acoustic wave propagation member coupled to the optical fiber.

47. The apparatus of claim 43, wherein the mode coupler couples a first core mode to a second core mode.

48. The apparatus of claim 43 wherein the mode coupler couples a core mode to a cladding mode.

49. The apparatus of claim 43 wherein the mode coupler couples a cladding mode to a core mode.

50. The apparatus of claim 43 wherein the mode coupler couples a cladding mode to a different cladding mode.

51. The apparatus of claim 43 wherein the mode coupler includes an acoustic wave generator that produces multiple acoustic signals with individual controllable strengths and frequencies, each of the acoustic signals providing a coupling between different modes traveling within the optical fiber.

52. The apparatus of claim 43, wherein the mode coupler includes a temperature controlled grating that is temperature tunable.

53. The apparatus of claim 43, wherein the mode coupler includes a stress induced grating that is stress tunable.

54. The apparatus of claim 43, wherein the mode coupler includes an acoustic wave generator that produces longitudinal waves.

55. The apparatus of claim 43, wherein the mode coupler includes an acoustic wave generator that produces torsional waves.

56. The apparatus of claim 43, wherein the mode coupler includes an acoustic wave generator that produces transverse waves.

57. The apparatus of claim 43, wherein the mode coupler includes an acoustic wave generator and a wavelength of an optical signal coupled between two different modes traveling within the optical fiber is changed by varying the frequency of a signal applied to the acoustic wave generator.

58. The apparatus of claim 43, wherein the mode coupler includes an acoustic wave generator and an amount of an optical signal coupled between two different modes traveling within the optical fiber is changed by varying the amplitude of a signal applied to the acoustic wave generator.

59. An optical apparatus for transmitting an optical signal, comprising:
    a static filter that has wavelength dependent transmission;
    a Faraday rotator;
    a reflector positioned along a first optical path defined by the static filter, the Faraday rotator and the reflector, the reflector reflecting at least a portion of the optical signal back in a direction towards the Faraday rotator along an optical path that is not the first optical path; and
    wherein the Faraday rotator makes a first change in polarization of the optical signal received from the static filter, and a second change in polarization of the optical signal received from the reflector to produce a polarization of the optical signal that is substantially orthogonal to an initial polarization state of the optical signal, wherein the Faraday rotator has a nominally 45° rotation for linear polarization.

60. The apparatus of claim 59, further comprising:
    a lens positioned to image the optical signal to an optical fiber.

61. The apparatus of claim 60, wherein the lens is positioned between the optical fiber and the static filter.

62. The apparatus of claim 60, wherein the lens is positioned between the static filter and the Faraday rotator.

63. The apparatus of claim 60, wherein the lens is positioned between the Faraday rotator and the reflector.

64. The apparatus of claim 59, wherein the reflector is a high reflector.

65. The apparatus of claim 59, wherein the reflector reflects at least 50% of incident light.

66. The apparatus of claim 59, wherein the static filter includes dielectric films and a transparent substrate.

67. The apparatus of claim 59, wherein the static filter is an interference filter.

68. The apparatus of claim 59, wherein the static filter is a fiber based filter.

69. The apparatus of claim 59, wherein the static filter is a waveguide filter.

70. The apparatus of claim 59, further comprising:
    a mode coupler coupled to an optical fiber and configured to create perturbations in the optical modes in the optical fiber and provide coherent coupling between a first mode to a second mode in the optical fiber.

71. The apparatus of claim 70, wherein the optical fiber has a cladding surrounding a core.

72. The apparatus of claim 70, wherein the mode coupler is selected from an acoustic grating, a UV grating, a bending grating and a stress induced grating.

73. The apparatus of claim 70, wherein the mode coupler includes an acoustic wave generator and an acoustic wave propagation member coupled to the optical fiber.

74. The apparatus of claim 70, wherein the mode coupler couples a first core mode to a second core mode.

75. The apparatus of claim 70, wherein the mode coupler couples a core mode to a cladding mode.

76. The apparatus of claim 70, wherein the mode coupler couples a cladding mode to a core mode.

77. The apparatus of claim 70, wherein the mode coupler couples a cladding mode to a different cladding mode.

78. The apparatus of claim 70, wherein the mode coupler includes an acoustic wave generator that produces multiple acoustic signals with individual controllable strengths and frequencies, each of the acoustic signals providing a coupling between different modes traveling within the optical fiber.

79. The apparatus of claim 70, wherein the mode coupler includes a temperature controlled grating that is temperature tunable.

80. The apparatus of claim 70, wherein the mode coupler includes a stress induced grating that is stress tunable.

81. The apparatus of claim 70, wherein the mode coupler includes an acoustic wave generator that produces longitudinal waves.

82. The apparatus of claim 70, wherein the mode coupler includes an acoustic wave generator that produces torsional waves.

83. The apparatus of claim 70, wherein the mode coupler includes an acoustic wave generator that produces transverse waves.

84. The apparatus of claim 70, wherein the mode coupler includes an acoustic wave generator and a wavelength of an optical signal coupled between two different modes traveling within the optical fiber is changed by varying the frequency of a signal applied to the acoustic wave generator.

85. The apparatus of claim 70, wherein the mode coupler includes an acoustic wave generator and an amount of an optical signal coupled between two different modes traveling within the optical fiber is changed by varying the amplitude of a signal applied to the acoustic wave generator.

* * * * *